United States Patent
Wiebe et al.

(10) Patent No.: US 10,430,361 B1
(45) Date of Patent: Oct. 1, 2019

(54) COMBINATION WRITE BLOCKER

(71) Applicant: CRU Acquisition Group, LLC, Vancouver, WA (US)

(72) Inventors: James P. Wiebe, Witchita, KS (US); Dean L. Mehler, Bel Aire, KS (US); Randal Barber, Portland, OR (US)

(73) Assignee: CRU Acquisition Group, LLC, Vancouver, WA (US)

( * ) Notice: Subject to any disclaimer, the term of this patent is extended or adjusted under 35 U.S.C. 154(b) by 343 days.

(21) Appl. No.: 15/383,750

(22) Filed: Dec. 19, 2016

Related U.S. Application Data (60) Provisional application No. 62/268,933, filed on Dec. 17, 2015.

(51) Int. Cl.
G06F 13/40 (2006.01)
G06F 3/06 (2006.01)
G06F 13/38 (2006.01)

(52) U.S. Cl.
CPC ........ *G06F 13/4022* (2013.01); *G06F 3/0622* (2013.01); *G06F 3/0659* (2013.01); *G06F 3/0673* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 5,825,715 A | 10/1998 | Rezeanu | |
| 6,032,237 A | 2/2000 | Inoue et al. | |
| 6,041,394 A | 3/2000 | Halligan et al. | |
| 6,397,310 B1 | 5/2002 | Adolph et al. | |
| 6,629,184 B1 | 9/2003 | Berg et al. | |
| 6,651,150 B2 | 11/2003 | Maeda | |
| 6,687,858 B1 | 2/2004 | Adams | |
| 6,760,807 B2 | 7/2004 | Brant et al. | |
| 6,813,682 B2 | 11/2004 | Bress et al. | |
| 6,907,512 B2 | 6/2005 | Hill et al. | |
| 7,069,475 B2 | 6/2006 | Adams | |
| 7,290,115 B2 | 10/2007 | Hill et al. | |
| 7,318,137 B2 | 1/2008 | Bress et al. | |
| 7,440,886 B2 | 10/2008 | Bress et al. | |
| 7,478,207 B2 | 1/2009 | Nogami | |

(Continued)

OTHER PUBLICATIONS

Tableau; Tableau Storage Manager (TSW-TSM); Product Overview; Downloaded from the Internet at URL https://www.guidancesoftware.com/products/Pages/tableau/products/software/tableau-storage-manager.aspx# on Apr. 9, 2015; 2 pages.

*Primary Examiner* — Idriss N Alrobaye
*Assistant Examiner* — Dayton Lewis-Taylor
(74) *Attorney, Agent, or Firm* — Kolisch Hartwell, P.C.

(57) ABSTRACT

A write blocking system may include a host computer. The host computer may include a host processor configured as a blocking driver. A separate connection interface device may be is configured to be operatively coupled to the host computer, and include a drive socket and a processor assembly. The drive socket may be connected to a storage drive. The processor assembly may communicate with the blocking driver while the connection interface device is operatively coupled to the host computer. The processor assembly may selectively establish communication between the storage drive and the host computer after communication between the processor assembly and the blocking driver. The blocking driver may prevent the host computer from altering data stored on the connected storage drive.

39 Claims, 4 Drawing Sheets

(56) References Cited

U.S. PATENT DOCUMENTS

| | | | |
|---|---|---|---|
| 7,523,281 | B2 | 4/2009 | Madathilparambil George et al. |
| 7,640,404 | B2 | 12/2009 | Macintyre et al. |
| 7,809,686 | B2 | 10/2010 | McCreight et al. |
| 8,037,361 | B2 | 10/2011 | Bish et al. |
| 8,082,585 | B1 | 12/2011 | Givonetti |
| 8,161,537 | B2 | 4/2012 | Gill et al. |
| 8,234,477 | B2 | 7/2012 | Shaath |
| 8,311,990 | B2 | 11/2012 | Martinek et al. |
| 8,474,032 | B2 | 6/2013 | Fetik |
| 8,656,095 | B2 | 2/2014 | Coulter |
| 8,656,487 | B2 | 2/2014 | Rothman et al. |
| 8,793,795 | B1 | 7/2014 | Ravid |
| 2014/0196004 | A1 | 7/2014 | Weinsberg et al. |
| 2014/0244522 | A1 | 8/2014 | McCreight |
| 2014/0281320 | A1 | 9/2014 | Sun |
| 2015/0003155 | A1 | 1/2015 | Jaskowiak et al. |

COMBINATION WRITE BLOCKER

RELATED APPLICATIONS

This application claims the benefit of U.S. Provisional Patent Application No. 62/268,933 filed on Dec. 17, 2015 and entitled "Combination Write Blocker," which application is incorporated herein by reference for all purposes.

BACKGROUND

This disclosure relates to computer data storage systems. More specifically, the disclosed embodiments relate to systems, methods, apparatus, and articles of manufacture for permitting read-only access to data storage devices without compromising the integrity of the data.

A write blocker permits read-only access to data storage devices without compromising the integrity of the data. Write blockers presently are in the form of software executed on a host computer or a physical device (hardware) connected between the host computer and a suspect storage device or drive.

Software and hardware write blockers do the same job. They prevent writes to storage devices. The main difference between the two types is that software write blockers are installed on a forensic computer workstation, whereas hardware write blockers have write blocking software installed on a controller chip inside a portable physical device. A software write block tool operates by monitoring and filtering drive I/O commands sent from an application or OS through a given access interface of the host computer workstation.

The primary purpose of a hardware write blocker is to intercept and prevent (or 'block') any modifying command operation from ever reaching the storage device. Hardware devices that write block may also provide visual indications of function through LEDs and switches. The hardware contains software (firmware) that does the actual blocking function, but it appears to the user to be a single element that "hardware blocks" the long term storage device that is attached. This makes them easy to use and makes functionality clear to users.

SUMMARY

Write blocking systems are disclosed that include a hardware connection interface device that communicates with a host computer. The connection interface device provides a communication path between a protected storage drive and the host computer.

In some embodiments, a write blocking system includes a host computer and a connection interface device physically separate from the host computer. The host computer includes a host storage device storing program instructions for a blocking driver, and a host processor operatively coupled to the host storage device and configured as a blocking driver while executing the blocking driver instructions. The connection interface device is configured to be operatively coupled to the host computer, and includes a drive socket and a processor assembly. The drive socket is configured to be connected to a storage drive. The processor assembly is configured to communicate with the blocking driver while the connection interface device is operatively coupled to the host computer. The blocking driver is configured to communicate with the processor assembly. The processor assembly is configured selectively to establish communication between the storage drive and the host computer after communication between the processor assembly and the blocking driver. The blocking driver is further configured to prevent the host computer from altering data stored on the connected storage drive.

In some embodiments, a method of write blocking includes executing program instructions for a blocking driver by a processor of the host computer. A communication is sent from a connection interface device, physically separate from and operatively coupled to the host computer, to the blocking driver. A communication is sent from the blocking driver to the connection interface device. The connection interface device receives the communication sent from the blocking driver. After receiving the communication sent from the blocking driver and after operative connection of a storage drive to the connection interface device, the connected storage drive is operatively coupled to the host computer by the connection interface device. The blocking driver prevents the host computer from altering data stored on the connected storage drive.

In some embodiments, a computer program product includes at least one computer readable storage medium having computer readable program instructions embodied therewith. The computer readable program instructions, when read by a processor of a host computer, configure the processor to receive a communication from a connection interface device physically separate from and operatively coupled to the host computer after a storage drive is operatively connected to the connection interface device; send an instruction to the connection interface device to couple the storage drive to the host computer; and prevent the host computer from altering data stored on the connected storage drive.

In some embodiments, a connection interface device is for use in a write blocking system. The write blocking system includes a host computer physically separate from the connection interface device. The host computer has a host storage device storing program instructions for a blocking driver and a host processor operatively coupled to the host storage device. The host processor is configured as a blocking driver while executing the blocking driver instructions. The blocking driver is configured to prevent the host computer from altering data stored on a storage drive connected to the connection interface device. The connection interface device is configured to be operatively coupled to the host computer. The connection interface device includes a drive socket configured to be connected to a storage drive, and a processor assembly. The processor assembly is configured to communicate with the blocking driver while the connection interface device is operatively coupled to the host computer. The processor assembly is configured, thereafter, selectively to establish communication between the storage drive.

Features, functions, and advantages may be achieved independently in various embodiments of the present disclosure, or may be combined in yet other embodiments, further details of which can be seen with reference to the following description and drawings.

DESCRIPTION

Various embodiments of a write blocking system having software and hardware components and related methods are described below and illustrated in the associated drawings. Unless otherwise specified, the system and/or its various components and related methods may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar apparatuses. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Aspects of a combination write blocking system may be embodied as a computer-related method, a computer-related system, an apparatus, or computer program product. Accordingly, aspects of the described combination write blocking system may be a combination of hardware and software, all of which may generally be referred to herein as a "circuit," "module," or "system." Software may be in any appropriate form, such as firmware, computer-readable instructions resident on a storage device, or micro-code. Furthermore, aspects of a combination write blocking system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium inherently in a computer storage device. A computer-readable storage medium may include an electronic, magnetic, optical, electromagnetic, infrared, and/or semiconductor system, apparatus, or device, or any suitable combination of these. More specific examples of a computer-readable storage medium may include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, and/or any suitable combination of these and/or the like. In the context of this disclosure, a computer-readable storage medium may include any suitable tangible or non-transitory medium that can contain or store a program for use by or in connection with an instruction execution system, processor, microprocessor, apparatus, or device.

A transitory, non-storage computer-readable signal medium may include a propagated data signal with computer-readable program code embodied therein, for example, in baseband or as part of a carrier wave. Such a propagated signal may take any of a variety of forms, including, but not limited to, electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the combination write blocking system may be written in one or any combination of programming languages, including an object-oriented programming language such as Java, Smalltalk, C++, and/or the like, a conventional procedural programming language, such as the C programming language, and/or an assembly language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the combination write blocking system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means, such as configuring a processor, for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of sample implementations of systems, methods, and computer program products according to aspects of the combination write blocking system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Selected aspects of exemplary combination write blocking systems as well as related methods are described. The examples are intended for illustration and should not be interpreted as limiting the entire scope of the present disclosure. Each section may include one or more distinct inventions, and/or contextual or related information, function, and/or structure.

Figure 1:
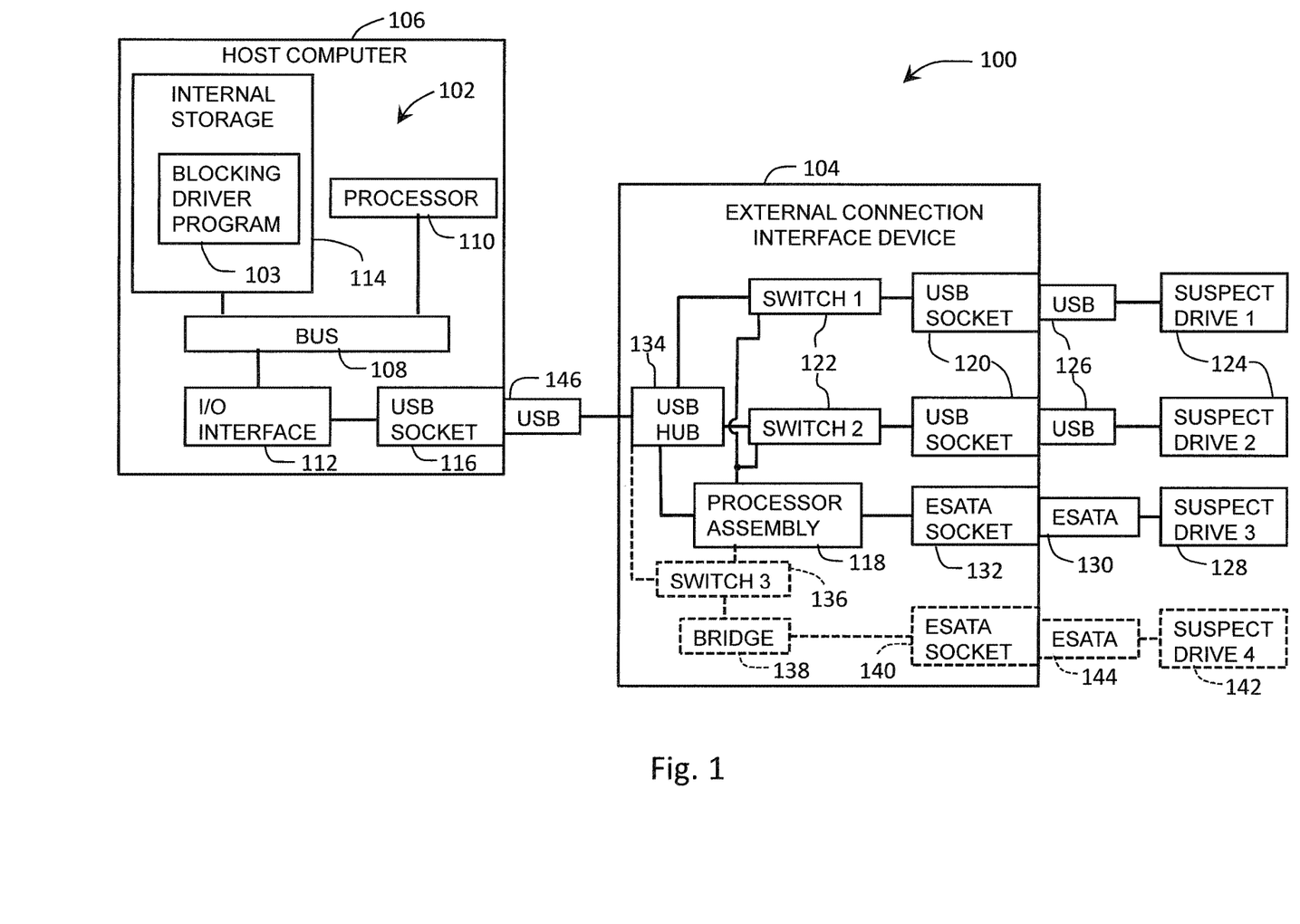
FIG. 1 is a block diagram of an illustrative combination write blocking system.

FIG. 1 is a block diagram of an illustrative combination write blocking system, generally indicated at 100 having a software-configuring component and a hardware component. Write blocking system 100 includes a blocking driver 102 and an external connection interface device 104, referred to herein as "the interface device" or "the ECID."

Blocking driver 102 may be configured to be operable when installed on a host computer 106. Host computer 106 may include a communications bus 108, a processor 110, an input/output (I/O) interface 112, internal storage 114, and a USB communication socket 116. Communications bus 108 provides communications between processor 110, internal storage 114, and (I/O) interface 112. Internal storage 114 and I/O interface 112 are examples of resources accessible by processor 110 via communications bus 108.

Processor 110 serves to run instructions that may be loaded into internal storage 114, such as blocking driver software 103 that when executed on processor 110 configures the processor as blocking driver 102. Processor 110 may be a number of processors, a multi-processor core, or some other type of processor, depending on the particular implementation. Further, processor 110 may be implemented using a number of heterogeneous processor systems in which a main processor is present with secondary processors on a single chip. As another illustrative example, processor 110 may be a symmetric multi-processor system containing multiple processors of the same type.

Internal storage 114 is any piece of hardware that is capable of storing information, such as, for example, without limitation, data, program code or software in functional form, and other suitable information either on a temporary basis or a permanent basis. Internal storage 114 also may be referred to as a computer-readable storage device in these examples. Internal storage may include memory, for example, a random access memory or any other suitable volatile or non-volatile storage device, and persistent storage which may take various forms. Blocking driver program 103 may be installed in internal storage 114.

Input/output (I/O) interface 112 allows for input and output of data with other devices that may be connected to host computer 106. For example, input/output (I/O) unit 112 may provide a connection to the external connection interface device 104. I/O interface 112 may connect to the ECID 104 through a suitable host communication socket, such as a USB socket 116. In some examples, an external storage device (not shown) may also provide some of the storage functions of internal storage 114 and be accessible to processor 110 via I/O interface 112.

External connection interface device 104 may include a processor assembly 118, one or more drive sockets 120 of a suitable type, and one or more switches 122. Each socket 120 of the one or more drive sockets may be connected to a switch 122 of the one or more switches. Each switch may be configured to be connected to the host computer as discussed further below.

The processor assembly 118 may be configured to be connected to the host computer 106 and may be configured to operate the one or more switches 122. The processor assembly may open or close the switches, thereby allowing or denying the host computer access to one or more suspect drives 124 which may be coupled to the one or more drive sockets 120 by a complementary plug 126. For example if drive sockets 120 are USB sockets, first and second suspect drives may be connected to the interface device 104 via USB plugs 126 inserted into sockets 120. The processor assembly may open or close the switches at the direction of the blocking driver 102, such as after verifying that the blocking driver is correctly installed and functioning on the host computer.

Processor assembly 118 may also serve as a bridge. For example, a third suspect drive 128 having an eSATA plug 130 may be connected to the external connection interface device 104 by inserting the eSATA plug 130 of the suspect drive into an eSATA drive socket 132 of the interface device 104. In this example, the processor assembly may serve as a bridge between the USB interface of the host computer and the eSATA interface of the third suspect drive. Additionally, the processor assembly may also function as a switch only allowing protected access to the third suspect drive by the host computer 106 when instructed to connect the third suspect drive to the host computer through the processor assembly.

External connection interface device 104 may include a USB hub 134. USB hub 134 may be included if the interface device has more than one drive socket for connecting to more than one suspect drive. The USB hub may allow the host computer 106 to selectively access the suspect drives connected to the interface device, once a secure connection has been established between the host blocking driver 102 and processor assembly 118 of interface device 104, preferably for each suspect drive.

In an alternative embodiment of external connection device 104, the switching and bridging functions of the processor assembly 118 may be performed by separate components. That is, the interface device may include a switch 136 connected to a bridge 138, with the bridge 138 also being connected to an eSATA drive socket 140. The switch 136 may be configured to connect to the host computer 106, such as through USB hub 134. Switch 136 may be opened and closed via a processor within the processor assembly as with switches 122. When a fourth suspect drive 142 is connected to the interface device via an eSATA plug 144 inserted into drive socket 140, and the switch 136 has been closed by the processor assembly to complete a communication path between the host computer 106 and the fourth suspect drive 142, bridge 138 may allow communication between the eSATA interface of the fourth suspect drive and the USB interface of the host computer.

The external connection interface device 104 may be physically connected to the host computer 106 by inserting a USB plug 146 of the interface device into the USB host socket 116 of the host computer. This may provide a communication channel between the interface device and the host computer. This connection may also allow for USB-powered operation of the interface device without the need for an interface device power supply.

It will be appreciated that many different communication interfaces are possible, both between the host computer 106 and the external connection interface device 104 and between the interface device and the one or more suspect drives 124, 128, and 142. For example, one or more of the connection interfaces may use any suitable interface standard, such as USB, Mini USB, Micro USB, Firewire, PCIe, Thunderbolt, or eSATA. In some examples, the interface device may have a single drive socket, or may have two or more drive sockets. Where there are two or more drive sockets, the drive sockets may be of the same type, or they may be of different types a shown in FIG. 1.

The blocking driver 102 may be configured to allow reading of data from any of the suspect drives 124, 128, and 142 by the host computer 106. The blocking driver may be configured to prevent writing of data to any of the suspect drives by the host computer. The blocking driver may be configured to prevent any altering of data on the suspect drives by the host computer. The blocking driver may perform these functions once the blocking driver has verified that the external connection interface device is connected between the host computer and the suspect drives, and may further verify that secure connections between the suspect drives and the host computer have been established. The blocking driver 102 may control what kind of signals or commands are sent from the host computer through the I/O interface 112. For example, the blocking driver may allow the I/O interface to send read commands to the one or more suspect drives but may not allow the I/O interface to send non-read commands or any commands that would alter data to the one or more suspect drives.

It will be seen then, that in some embodiments a write blocking system 100 includes a host computer 106 and a connection interface device 104 physically separate from the host computer 106. The host computer 106 includes a host storage device 114 storing program instructions 103 for a blocking driver 102 on a computer-readable storage medium, and a host processor 110 operatively coupled to the host storage device 114 and configured as a blocking driver 102 while executing the blocking driver instructions 103. The connection interface device 104 is configured to be operatively coupled to the host computer 106, and includes a drive socket 120 and a processor assembly 118. The drive socket 120 is configured to be connected to a storage drive 124. The processor assembly 118 is configured to communicate with the blocking driver 102 while the connection interface device 104 is operatively coupled to the host computer 106. The blocking driver 102 is configured to communicate with the processor assembly 118. The processor assembly 118 is configured selectively to establish communication between the storage drive 124 and the host computer 106 after communication between the processor assembly 118 and the blocking driver 102. The blocking driver 102 is further configured to prevent the host computer 106 from altering data stored on the connected storage drive 124.

It will also be appreciated, that in some embodiments a computer program product 114 includes at least one computer readable storage medium having computer readable program instructions 103 embodied therewith. The computer readable program instructions 103, when read by a processor 110 of a host computer 106, configure the processor 110 to receive a communication from a connection interface device 104 physically separate from and operatively coupled to the host computer 106 after a storage drive 124 is operatively connected to the connection interface device 104; send an instruction to the connection interface device 104 to couple the storage drive 124 to the host computer 106; and prevent the host computer 106 from altering data stored on the connected storage drive 124.

It will also be appreciated that in some embodiments a connection interface device 104 is for use in a write blocking system 100. Write blocking system 100 includes host computer 106 physically separate from connection interface device 104. Host computer 106 has a host storage device 114 storing program instructions 103 for blocking driver 102 and host processor 110 operatively coupled to host storage device 114. Host processor 110 is configured as blocking driver 102 while executing blocking driver instructions 103. Blocking driver 102 is configured to prevent host computer 106 from altering data stored on storage drive 124 connected to connection interface device 104. Connection interface device 104 is configured to be operatively coupled to host computer 106. Connection interface device 104 includes drive socket 120 configured to be connected to storage drive 124, and processor assembly 118. Processor assembly 118 is configured to communicate with blocking driver 102 while connection interface device 104 is operatively coupled to host computer 106. Processor assembly 118 is configured thereafter, selectively to establish communication between storage drive 124 and host computer 106.

In some examples, blocking driver 102 is configured to send to processor assembly 118 and the processor assembly is configured to receive from the blocking driver an instruction to couple storage drive 124 to host computer 106. Processor assembly 118 is further configured to couple storage drive 124 to host computer 106 in response to the received instruction.

In some examples, blocking driver 102 is configured to send to processor assembly 118 a first coded communication, and the processor assembly is configured to recognize the first coded communication as a communication from an acceptable blocking driver 102. The processor assembly may couple selectively storage drive 124 to host computer 106 only after receiving the first coded communication from the acceptable blocking driver 102. Processor assembly 118 may be further configured to send to blocking driver 102 a second coded communication in response to receiving the first coded communication, and the blocking driver may be configured to recognize the second coded communication as a communication from an acceptable processor assembly 118. Blocking driver 102 may be configured to send to processor assembly 118 an instruction to couple storage drive 124 to host computer 106 in response to the blocking driver receiving the second communication from the acceptable processor assembly. Processor assembly 118 may be configured to receive the instruction from blocking driver 102 and the processor assembly may be configured to couple the storage drive to the host computer in response to the received instruction.

In some examples, connection interface device 104 includes switch 122 connected to drive socket 120 and operable to couple drive socket 120 to host computer 106 when storage drive 124 is connected to drive socket 120, and processor assembly 118 is configured to operate switch 120 to operatively couple the connected storage drive 124 to host computer 106.

In some examples, connection interface device 104 includes a plurality of drive sockets 120 configured to be connected to respective storage drives 124 and a corresponding plurality of switches 122, each switch 122 being connected to a respective one of the plurality of drive sockets 120 and being operable to couple the respective drive socket 120 to host computer 106 when the respective storage drive 124 is connected to the respective drive socket. Processor assembly 118 may be configured to operate each of the plurality of switches 122 to couple the respective connected storage drive 124 to the host computer. In some examples, host computer 106 further includes a communication socket 116 and connection interface device 104 includes a hub 134 configured to operatively couple the plurality of switches 122 to communication socket 116 for operatively coupling connection interface device 104 to host computer 106.

A combination write blocking system, such as system 100, including software components, such as blocking driver program 103, configured to be installed on a host computer and external hardware components, such as external connection interface device 104, may have several advantages over write blocking systems that include only one of a host-computer-based software blocking system or an external hardware-based blocking system separate from the host computer.

It can be difficult to verify that a software-only write blocker was in use when a suspect drive was examined. As write blocking systems are often used by forensic examiners it may be important to prove in court that the system was in operation when the suspect drive was connected to the forensic examiner's computer.

In contrast, hardware-only write blockers can be examined to see if they are working properly, perhaps even by a defense attorney. Thus, forensic examiners have largely converted from using software-only write blockers to using hardware-only write blockers.

Combination software and hardware write blockers, such as system 100, have advantages over separate hardware-only write blockers (HWBs). First, combination write blockers may be significantly less expensive than HWBs. Since HWBs must perform all write blocking functions and manage communication between the host computer and the suspect drives, the hardware and/or firmware inherent in a HWB is necessarily complicated. It can be expensive to develop such a device.

Second, the simplified circuits and components of a combination write blocker may allow for a much smaller device than a HWB. Correspondingly, a combination write blocker may require much less power to operate than a HWB. Thus, a combination write blocker may be powered via the communications link to the host computer, for example through a USB connection. Alternatively, a combination write blocker may be powered by a resident power supply that is smaller than the power supply a HWB would use.

Third, combination write blockers may have performance advantages over HWBs. The bridges used in HWBs are inserted between the suspect drives and the host. The HWB has to process each transfer between the suspect drives and the host. Thus, the bridge in the HWB causes some types of performance degradation. In contrast, there may be no bridge between the suspect drives and the host computer, for example between suspect drives 124 and host computer 106 described above. That is, there may be no processing of the transfers by any silicon components and the transfers may proceed at native wire speed. The USB hub 134 may not adversely affect performance as USB hubs are optimized to allow full bandwidth performance for a few connection points. Blocking driver 102 may not adversely affect performance as compared to a HWB, since some sort of drive driver would need to be installed on a host computer even when using a hardware-only write blocker, and the blocking driver 102 may not perform any worse than such a driver.

Figure 2:
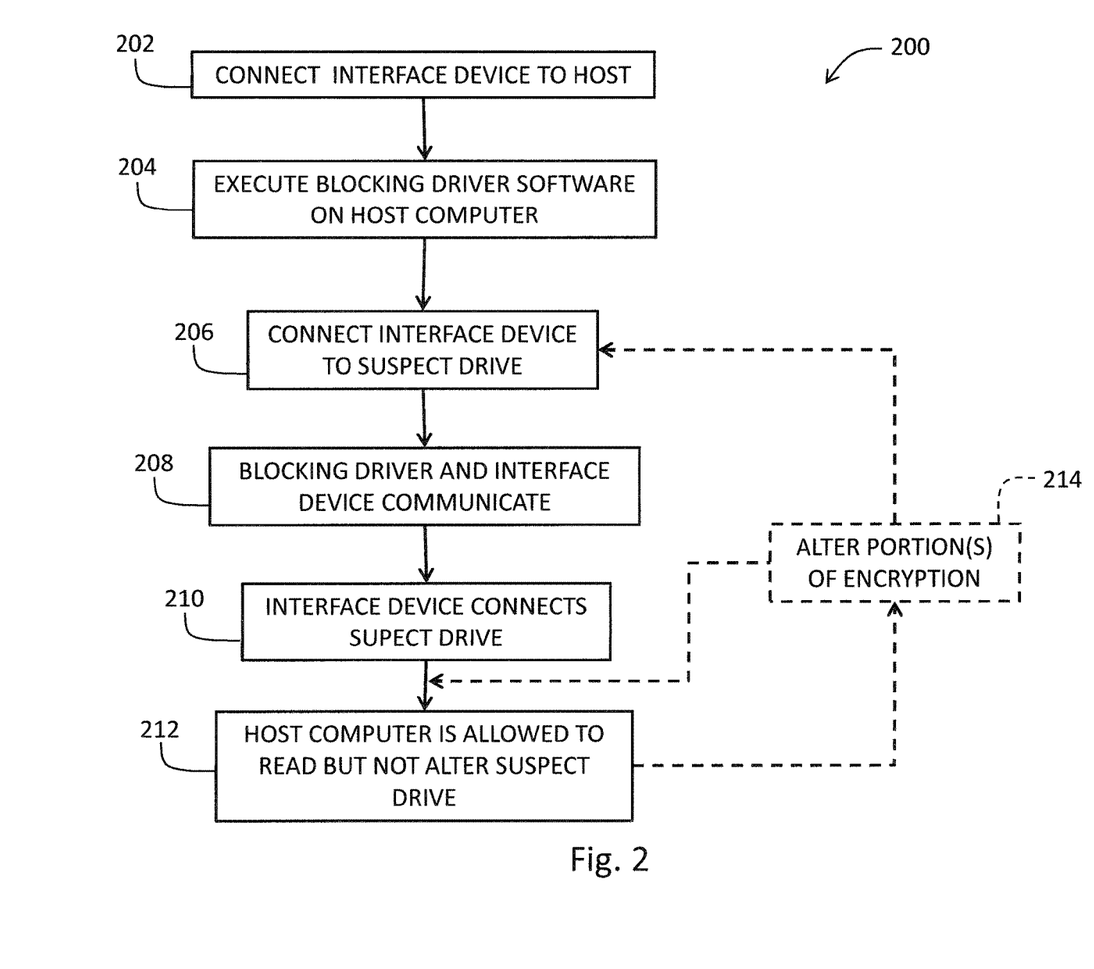
FIG. 2 is a flow chart illustrating various steps of a method for protecting a suspect drive against altering of data contained within the suspect drive.
Figure 3:
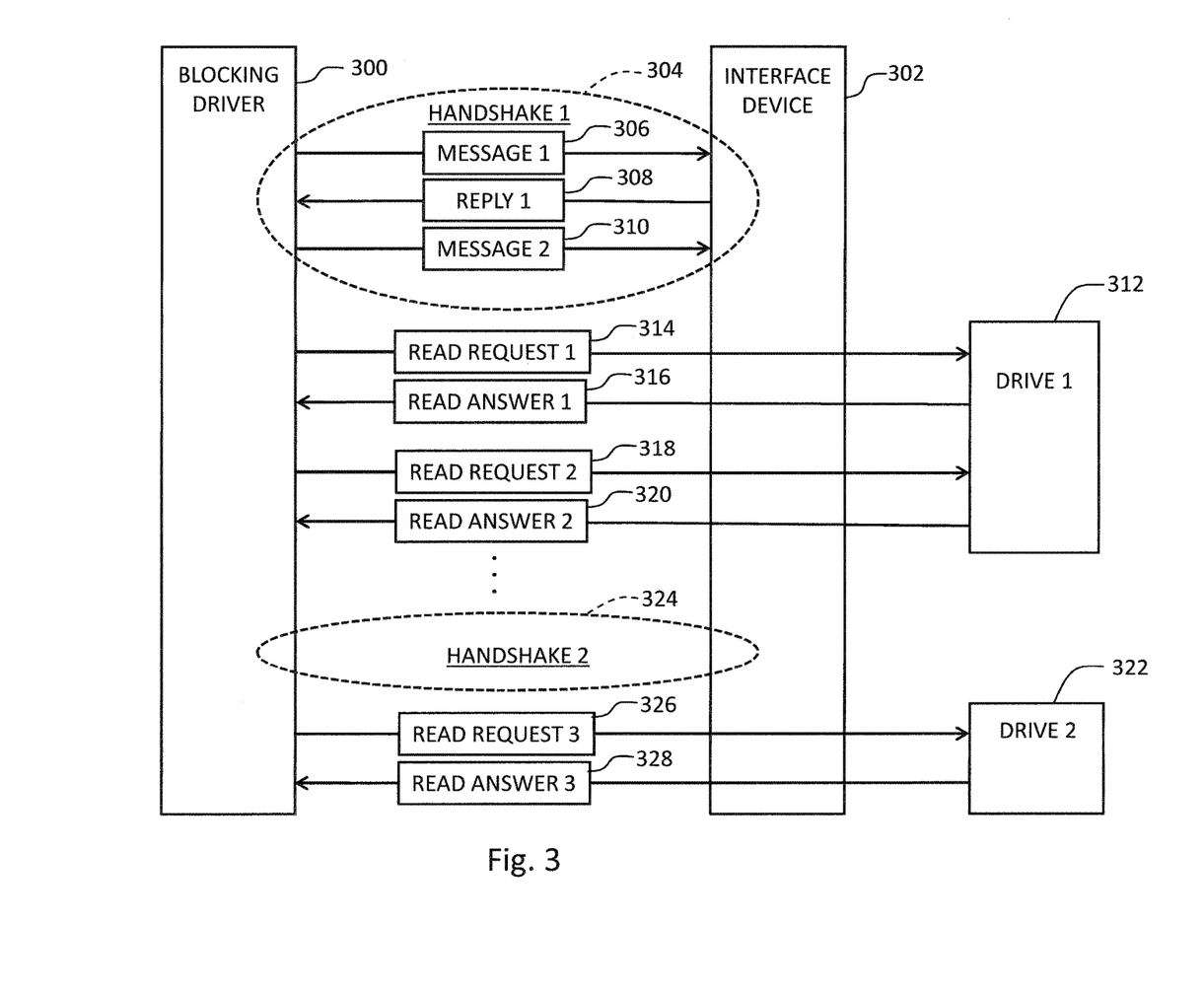
FIG. 3 is a schematic block diagram illustrating various communication sequences between a blocking driver, an external connection interface device, and one or more suspect drives.
Figure 4:
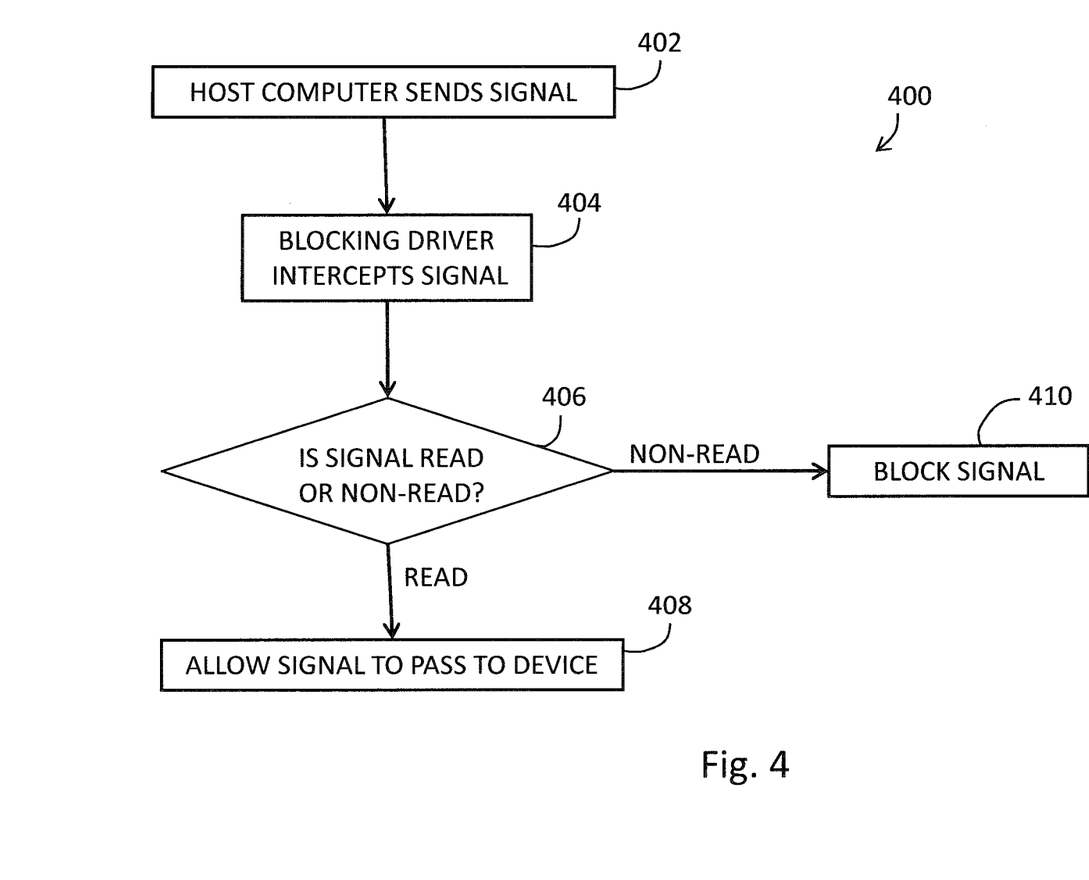
FIG. 4 is a flow chart illustrating various steps of a method of permitting read-only access to one or more data storage devices.

FIGS. 2-4 illustrate aspects of an exemplary method for protecting data on a suspect drive from being altered. The method may be used in conjunction with the apparatuses and systems described herein.

FIG. 2 depicts multiple steps of a method, generally indicated at 200, for protecting data stored on a suspect storage drive, while allowing the stored data to be read. Method 200 may be used in conjunction with the combination write blocking system 100 described in Example 1. Although various steps of method 200 are described below and depicted in FIG. 2, the steps need not necessarily all be performed, and in some cases may be performed in a different order than the order shown.

Method 200 may include configuring a write blocking system, such as write blocking system 100. Configuring the write blocking system may include installing a blocking driver software program on a host computer, connecting in a step 202 an external connection interface device (ECID) 104 to host computer 106, launching the blocking driver software program 103. The blocking driver software program is executed by processor 110 on host computer 106 in a step 204. As mentioned above, the processor executing the blocking driver software is also be referred to simply as blocking driver 102. Connecting the ECID to the host computer may establish a host communication channel between the blocking driver, installed on the host computer, and the ECID. The blocking driver software may be launched when the host computer receives an indication that the ECID has been connected to the host computer. The blocking driver software may be automatically launched when the ECID has been detected.

Method 200 may include a step 206 of connecting ECID 104 to a suspect storage device or drive 124. Step 206 may include detecting, in one or more sockets 120 of the ECID, a physical connection to one or more suspect drives 124. The physical connection may establish one or more device communication channels between the ECID and the one or more suspect drives or other data storage devices. The ECID may include an internal physical space, such as a drive bay, configured to receive the one or more suspect drives when they are connected to the one or more sockets of the ECID. In such a case, the ECID may be locked or otherwise sealed shut with the connected suspect drives held within the interface device.

Method 200 may include a step 208 of the blocking driver and the ECID communicating, such as performing one-way or mutual authentication or other communication, referred to generally as a handshake. Preferably the handshake and other communications between ECID 104 and host computer 106 are encrypted. The handshake may allow the ECID to verify that blocking driver 102 is operational on host computer 106. The handshake may allow the ECID to recognize the blocking driver as an acceptable blocking driver, and the blocking driver to recognize the ECID as an acceptable ECID.

Once blocking driver 102 and ECID 104 have performed the handshake, method 200 may include a step 210 of the ECID connecting one or more suspect drives 124 to host computer 106. In some examples, the blocking driver sends the ECID an instruction to connect the one or more suspect drives to the host computer, such as by connecting the host communication channel to the one or more drive device communication channels. The ECID then connects the one or more suspect drives to the host computer in response to receiving the instruction. In other examples, the ECID connects the one or more suspect drives in response to completion of the handshake between the blocking driver and the interface device, or upon receipt by the ECID of an acceptable communication from the blocking driver. Taken together, steps 202, 204, 206, 208, and 210 may describe steps involved in mounting the one or more suspect drives or storage devices to the host computer. An example of step 208 is described further in reference to FIG. 3 below.

In some examples, once the blocking driver detects the ECID connected to the host computer, the blocking driver may send to the ECID a single encoded message informing the ECID that the blocking driver is operational on the host computer. In response to the receipt of the encoded message from the blocking driver, the ECID may authenticate the blocking driver. If the blocking driver is authenticated, the ECID may then proceed to connect the one or more suspect drives to the host computer.

Method 200 may include a step 212 of the blocking driver allowing the host computer to read the one or more suspect drives, but not writing to or otherwise altering the one or more suspect drives. That is, the blocking driver, together with the ECID, may allow the host computer to read data contained within the one or more suspect drives and may prevent the host computer from altering data contained within the one or more suspect drives. Step 212 is described further in reference to FIG. 4 below.

Method 200 may include a step 214 of altering portion(s) of an encryption scheme used by the host computer and ECID. For example, portions of private or public encryption keys may be changed. Step 214 may be performed in between uses of the write blocking system. For example, the write blocking system may be used to read data from a first suspect drive, a portion or portions of the encryption may be altered, and then the write blocking system may be used to read data from a second suspect drive. Alternately, a portion or portions of the encryption scheme may be changed while the host computer is reading data from the first suspect drive, that is, between subsequent communications from the host computer to the first suspect drive. Step 214 may be performed as part of a loop between step 212 and step 206.

It is thus seen that in some embodiments a method 200 of write blocking includes executing at step 204 program instructions for a blocking driver 102 by processor 110 of host computer 106. A communication is sent in step 208 from connection interface device 104, physically separate from and operatively coupled to host computer 106, to blocking driver 102. A communication is sent in step 208 from blocking driver 102 to connection interface device 104. Connection interface device 104 receives the communication sent from blocking driver 102. After receiving the communication sent from blocking driver 102 and after operative coupling in step 206 of storage drive 124 to connection interface device 104 by the user, connected storage drive 124 is operatively coupled to host computer 106 by connection interface device 104 in step 210. Blocking driver 102 prevents in step 212 host computer 106 from altering data stored on connected storage drive 124.

FIG. 3 is a schematic block diagram illustrating various exemplary communications between a blocking driver 300 installed on a host computer, such as host computer 106, an external connection interface device (ECID or interface device) 302, such as ECID 104, and one or more suspect drives 312, 322. FIG. 3 may indicate the passage of time, with earlier events indicated toward the top of FIG. 3 and later events indicated toward the bottom of FIG. 3. The specific order of events shown in FIG. 3 is meant to be exemplary and should not be taken to be the only possible order of events. The communication shown in FIG. 3 may allow the host computer to read data stored on one or more data storage devices or suspect drives.

Blocking driver 300 and external connection interface device 302 may perform a first handshake 304. Performing handshake 304 may include sending a first encrypted message 306 from the blocking driver to the ECID, sending a first encrypted reply 308 from the ECID to the blocking driver, and sending a second encrypted message 310 from the blocking driver to the ECID. In some examples, the handshake messages may not be encrypted. In different examples, the authenticating handshake may be a single message between one of the blocking driver and ECID to the other, or two or more messages that are exchanged.

In this example, the first encrypted message 306 may be encrypted with a public key. The first encrypted message may be a pre-established coded message that a processor in the ECID is configured to recognize, such as by the use of a common encryption scheme or by comparing the content of the message to corresponding information stored by the ECID as a form of authentication. By receiving the first encrypted message the ECID may verify that a correct or acceptable blocking driver is operational on the host computer.

The first encrypted reply 308 may be encrypted with a private key. The first encrypted reply may be a pre-established coded message that the blocking driver is configured to recognize, such as by comparing the content of the message to corresponding information stored by the host computer. By receiving the first encrypted reply the blocking driver may verify that the ECID is attached to the host computer and/or that the ECID is a correct or acceptable ECID.

If the first encrypted reply is correct, the blocking driver may send the second encrypted message 310 to the ECID. The second encrypted message 310 may be encrypted with a public key. The second encrypted message may be a pre-established coded message that a processor in the ECID is configured to recognize. The second encrypted message may be in effect an instruction, including a permission, consent, or acknowledgement that the ECID is to connect a first suspect drive 312 to the host computer. That is, the ECID may turn on or open a first downstream port allowing the first suspect drive to mount to the host computer. Referring to FIG. 1, the processor assembly 118 of ECID 104 may close a switch 122 so that a first suspect drive 124 may connect or mount to blocking driver 102.

Once secure communication has been established via first handshake 304, the host computer may commence reading data from first suspect drive 312. For example, the host computer may send, via the blocking driver, a first read request 314 to the first suspect drive. The first read request may pass through ECID 302 at, or nearly at, native wire speed. The first suspect drive may then send the requested data back to the host computer via a first read answer 316. A second read request 318 may follow and then a corresponding second read answer 320, etc. All read requests and all read answers may be encrypted. The blocking driver may continue to read data from the first suspect drive so long as the blocking driver, the ECID, and the first suspect drive remain connected.

If the first suspect drive is ever disconnected from the ECID or the ECID becomes disconnected from the host computer, the first suspect drive may subsequently be taken by the write blocking system as a new suspect drive and the above procedure may be repeated. Alternatively or additionally, if a second suspect drive 322 is to be read by the host computer, a second handshake 324 between the blocking driver and the interface device may be performed. The second handshake 324 may be similar to the first handshake 304, with the possible exception, when encryption is used, of a change in a portion or portions of an encryption scheme as described above in reference to step 210 of method 200. Once the second handshake has been successfully completed and the second suspect drive 322 is connected through the interface device 302 and mounted to the host computer, the host computer may commence reading, via the blocking driver, data from the second suspect drive 322. That is, the blocking driver may send a third read request 326 to the second suspect drive and the second suspect drive may respond with a third read answer 328.

FIG. 4 is a flow chart illustrating various steps of a method, generally indicated at 400, of permitting read-only access to one or more data storage devices, such as a suspect drive 124. Method 400 may be used in conjunction with the combination write blocking system 100 described in Example 1. Although various steps of method 400 are described below and depicted in FIG. 4, the steps need not necessarily all be performed, and in some cases may be performed in a different order than the order shown. Some or all of method 400 may correspond to some or all of step 212 of method 200.

Method 400 may include a step 402 of a host computer 106 sending a signal, such as a command. The host computer may have a blocking driver software program 103 installed and executing on a processor 110 as a blocking driver 102. The host computer may be connected to an external connection interface device (ECID) 104, and the blocking driver may have established one or more secure communication channels to one or more suspect drives or storage devices 124 through the ECID as described with reference to FIGS. 2 and 3. The signal sent by the host computer may be a signal to the one or more suspect drives and may be a read signal or command or a non-read signal or command. A read signal may be a request by the host computer to read, but not alter, data stored on the one or more suspect drives. A non-read signal may be a request by the host computer to alter data stored on the one or more suspect drives, for example, writing data to the drive(s) or deleting data stored on the drive(s).

Method 400 may include a step 404 of the blocking driver intercepting the signal. When the blocking driver intercepts a signal, method 400 may include a step 406 of determining, by the blocking driver, if the signal is a read signal or a non-read signal. Thus, the blocking driver may monitor communications between the host computer and the one or more data storage devices through the ECID. In the case where the blocking driver determines the signal to be a read signal or command, method 400 may proceed to step 408. In the case where the blocking driver determines the signal to be a non-read signal or command, method 400 may proceed to step 410.

In step 408, the blocking driver allows the signal to pass to the interface device. That is, the blocking driver may allow the host computer to read data stored on the one or more storage devices. The blocking driver may only allow the host computer to read data stored on the one or more storage devices if the blocking driver has determined that the one or more storage devices have been connected to the host computer through the ECID as discussed above.

Method 400 may include a step 410 of blocking the signal. Step 410 may be performed if the blocking driver has determined that the host computer is attempting to write to the one or more storage devices or otherwise alter data stored on the one or more storage devices. Thus, the blocking driver may prevent the host computer from altering data stored on the one or more storage devices.

Accordingly, a method for protecting a suspect drive against altering of data contained within the suspect drive, may include receiving, by a host processor executing blocking driver software on a host computer (i.e., a blocking driver), an indication that an external connection interface device has been connected to the host computer. A physical connection of one or more sockets of the external connection interface device to one or more suspect drives may be detected. An encrypted handshake may be performed between the host processor while executing the blocking driver software and the external connection interface device by sending a first encrypted message from the host processor while executing the blocking driver software to the external connection interface device, and sending a first encrypted reply from the external connection interface device to the host processor while executing the blocking driver software. A second encrypted message may be sent from the host processor while executing the blocking driver software to the external connection interface device instructing the external connection interface device to connect the one or more suspect drives to the host computer. The one or more suspect drives may be mounted to the host computer. The host processor, while executing the blocking driver software, may allow the host computer to read data contained within the one or more suspect drives and prevent the host computer from altering data contained within the one or more suspect drives.

In some examples, a method for permitting read-only access to one or more data storage devices may include mounting one or more storage devices to a host computer. Mounting the one or more storage devices may include establishing a host communication channel between a blocking driver installed on the host computer and an external connection interface device, establishing one or more device communication channels between the external connection interface device and one or more data storage devices, verifying, by the external connection interface device, that the blocking driver is operational, recognizing, by the external connection interface device, the blocking driver, recognizing, by the blocking driver, the external connection interface device, and connecting the host communication channel to the one or more device communication channels. Communications between the host computer and the one or more data storage devices through the external connection interface device may be monitored. The host computer may be allowed to read data stored on the one or more data storage devices, and prevented from altering data stored on the one or more data storage devices.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the invention(s) includes combinations and subcombinations of the various elements, features, functions, and/or properties disclosed herein. The following claims particularly point out certain combinations and subcombinations. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

What is claimed is:
1. A write blocking system comprising:
   a host computer including:
      a host storage device storing program instructions for a blocking driver, and
      a host processor operatively coupled to the host storage device and configured as a blocking driver while executing the blocking driver instructions;
   a connection interface device physically separate from the host computer and configured to be operatively coupled to the host computer, the connection interface device including:
      a drive socket configured to be connected to a storage drive, and
      a processor assembly configured to communicate with the blocking driver while the connection interface device is operatively coupled to the host computer; and
   wherein the blocking driver is configured to communicate with the processor assembly, the processor assembly is configured selectively to establish communication between the storage drive and the host computer after communication between the processor assembly and the blocking driver, and the blocking driver is further configured to prevent the host computer from altering data stored on the connected storage drive.

2. The write blocking system of claim 1, wherein the blocking driver is configured to send to the processor assembly and the processor assembly is configured to receive from the blocking driver an instruction to couple the storage drive to the host computer, and the processor assembly is further configured to couple the storage drive to the host computer in response to the received instruction.

3. The write blocking system of claim 1, wherein the blocking driver is configured to send to the processor assembly a first coded communication, and the processor assembly is configured to recognize the first coded communication as a communication from an acceptable blocking driver.

4. The write blocking system of claim 3, wherein the processor assembly couples selectively the storage drive to the host computer only after receiving the first coded communication from the acceptable blocking driver.

5. The write blocking system of claim 3, wherein the processor assembly is further configured to send to the blocking driver a second coded communication in response to receiving the first coded communication, and the blocking driver is configured to recognize the second coded communication as a communication from an acceptable processor assembly.

6. The write blocking system of claim 5, wherein the blocking driver is configured to send to the processor assembly an instruction to couple the storage drive to the host computer in response to the blocking driver receiving the second communication from the acceptable processor assembly, the processor assembly is configured to receive the instruction from the blocking driver and processor assembly is further configured to couple the storage drive to the host computer in response to the received instruction.

7. The write blocking system of claim 1, wherein the processor assembly is further configured to send to the blocking driver a coded communication and the blocking driver is configured to recognize the coded communication as a communication from an acceptable processor assembly.

8. The write blocking system of claim 7 wherein the blocking driver is configured to send to the processor assembly an instruction to couple the storage drive to the host computer in response to the blocking driver receiving the coded communication from the acceptable processor assembly, and the processor assembly is configured to receive the instruction from the blocking driver and to couple the storage drive to the host computer in response to the received instruction.

9. The write blocking system of claim 1, wherein the connection interface device further includes a switch connected to the drive socket and operable to couple the drive socket to the host computer when the storage drive is connected to the drive socket, and the processor assembly is configured to operate the switch to operatively couple the connected storage drive to the host computer.

10. The write blocking system of claim 1, wherein the connection interface device further includes a plurality of drive sockets configured to be connected to respective storage drives, and a corresponding plurality of switches, each switch being connected to a respective one of the plurality of drive sockets and being operable to couple the respective drive socket to the host computer when the respective storage drive is connected to the respective drive socket, and the processor assembly is configured to operate each of the plurality of switches to couple the respective connected storage drive to the host computer.

11. The write blocking system of claim 10, wherein the host computer further includes a communication socket and the connection interface device further includes a hub configured to operatively couple the plurality of switches to the communication socket for operatively coupling the connection interface device to the host computer.

12. A method of write blocking comprising:
   executing program instructions for a blocking driver by a processor of a host computer;
   sending a communication from a connection interface device to the blocking driver, the connection interface device being physically separate from and operatively coupled to the host computer;
   sending a communication from the blocking driver to the connection interface device;
   receiving by the connection interface device the communication sent from the blocking driver;
   after the receiving step and after operative coupling of a storage drive to the connection interface device by a user, operatively coupling the connected storage drive to the host computer by the connection interface device; and
   preventing, by the blocking driver, the host computer from altering data stored on the connected storage drive.

13. The method of claim 12, wherein sending the communication from the connection interface device to the host computer includes sending the communication from the connection interface device to the host computer after a storage drive is operatively connected to the connection interface device.

14. The method of claim 13, wherein sending the communication from the host computer to the connection interface device includes sending the communication as an instruction instructing the connection interface device to couple the storage drive to the host computer.

15. The method of claim 12, further comprising sending by the blocking driver to the connection interface device an instruction to couple the storage drive to the host computer and receiving the instruction by the connection interface device, and wherein operatively coupling the connected storage drive to the host computer includes operatively coupling by the connection interface device the connected storage drive to the host computer in response to the received instruction.

16. The method of claim 12, wherein sending the communication from the blocking driver includes sending the communication from the blocking driver to the connection interface device the communication as a first coded communication, and receiving by the connection interface device the communication sent from the blocking driver includes receiving by the connection interface device the first coded communication, the method further comprising recognizing by the connection interface device the first coded communication as a communication from an acceptable blocking driver.

17. The method of claim 16, wherein operatively coupling the connected storage drive to the host computer by the connection interface device includes operatively coupling the connected storage drive to the host computer by the connection interface device in response to receiving the first coded communication from the acceptable blocking driver.

18. The method of claim 16, wherein sending the communication from the connection interface device to the blocking driver includes sending the communication from the connection interface device to the blocking driver as a second coded communication in response to receiving the first coded communication, the method further comprising recognizing by the blocking driver the second coded communication as a communication from an acceptable connection interface device.

19. The method of claim 18, further comprising sending, by the blocking driver in response to receiving the second coded communication from the acceptable connection interface device, to the connection interface device an instruction to couple the storage drive to the host computer and receiving the instruction by the connection interface device, and wherein operatively coupling the connected storage drive to the host computer includes operatively coupling by the connection interface device the connected storage drive to the host computer in response to the received instruction.

20. The method of claim 12, wherein the connection interface device includes a plurality of drive sockets configured to be connected to respective storage drives, and a corresponding plurality of switches, each switch being connected to a respective one of the plurality of drive sockets and being operable to couple the respective drive socket to the host computer when the respective storage drive is connected to the respective drive socket, and the method further comprises operating by the connection interface device each of the plurality of switches to couple the respective connected storage drive to the host computer.

21. The method of claim 20, wherein the host computer further includes a communication socket and the method further comprises coupling the plurality of switches to the communication socket.

22. The method of claim 20, further comprising sending by the blocking driver a first communication to one of the plurality of storage drives using an encryption scheme, modifying the encryption scheme, and then sending by the blocking driver a second communication to the same one of the plurality of storage drives or a different one of the plurality of storage drives using the modified encryption scheme.

23. The method of claim 12, wherein sending the communication from the blocking driver to the connection interface device includes sending an encrypted communication from the blocking driver to the connection interface device.

24. A computer program product comprising:
at least one non-transitory computer readable storage medium having computer readable program instructions embodied therewith, the computer readable program instructions, when read by a processor of a host computer, configuring the processor to:
receive a communication from a connection interface device physically separate from and operatively coupled to the host computer after a storage drive is operatively connected to the connection interface device;
send an instruction to the connection interface device to couple the storage drive to the host computer; and
prevent the host computer from altering data stored on the connected storage drive.

25. The computer program product of claim 24, wherein the computer readable program instructions, when read by the processor further configure the processor to receive a coded communication from the connection interface device and recognize the coded communication as a communication from an acceptable connection interface device.

26. The computer program product of claim 24, wherein the computer readable program instructions, when read by the processor further configure the processor to sending a coded communication to the connection interface device indicating the host computer is an acceptable host computer.

27. The computer program product of claim 26, wherein the computer readable program instructions, when read by the processor further configure the processor to send the coded communication to the connection interface device as an encrypted communication.

28. The computer program product of claim 24, wherein the connection interface device is connected to a plurality of storage drives, and the computer readable program instructions, when read by the processor further configure the processor to send a first communication to one of the plurality of storage drives using an encryption scheme, modify the encryption scheme, and then send a second communication to the same one of the plurality of storage drives or a different one of the plurality of storage drives using the modified encryption scheme.

29. A connection interface device for use in a write blocking system including a host computer physically separate from the connection interface device, the host computer having a host storage device storing program instructions for a blocking driver, and including a host processor operatively coupled to the host storage device and configured as a blocking driver while executing the blocking driver instructions, the blocking driver being configured to prevent the host computer from altering data stored on a storage drive connected to the connection interface device, and the connection interface device being configured to be operatively coupled to the host computer, the connection interface device comprising:
a drive socket configured to be connected to a storage drive, and
a processor assembly configured to communicate with the blocking driver while the connection interface device is operatively coupled to the host computer and, thereafter, selectively to establish communication between the storage drive and the host computer.

30. The connection interface device of claim 29, wherein the processor assembly is configured to receive from the blocking driver an instruction to couple the storage drive to the host computer, and the processor assembly is further configured to couple the storage drive to the host computer in response to the received instruction.

31. The connection interface device of claim 29, wherein the processor assembly is configured to recognize a first coded communication from the blocking driver as a communication from an acceptable blocking driver.

32. The connection interface device of claim 31, wherein the processor assembly couples selectively the storage drive to the host computer only after receiving the first coded communication from the acceptable blocking driver.

33. The connection interface device of claim 31, wherein the processor assembly is further configured to send to the blocking driver a second coded communication in response to receiving the first coded communication, the second coded communication indicating that the processor assembly is an acceptable processor assembly.

34. The connection interface device of claim 33, wherein the blocking driver is configured to send to the processor assembly an instruction to couple the storage drive to the host computer in response to the blocking driver receiving the second communication from the acceptable processor assembly, the processor assembly is configured to receive from the blocking driver an instruction to couple the storage drive to the host computer, and to couple the storage drive to the host computer in response to the received instruction.

35. The connection interface device of claim 29, wherein the processor assembly is further configured to send to the blocking driver a coded communication indicating that the processor assembly is an acceptable processor assembly.

36. The connection interface device of claim 35 wherein the blocking driver is configured to send to the processor assembly an instruction to couple the storage drive to the host computer in response to the blocking driver receiving the coded communication from the acceptable processor assembly, and the processor assembly is configured to receive from the blocking driver an instruction to couple the storage drive to the host computer, and to couple the storage drive to the host computer in response to the received instruction.

37. The connection interface device of claim 29, wherein the connection interface device further includes a switch connected to the drive socket and operable to couple the drive socket to the host computer when the storage drive is connected to the drive socket, and the processor assembly is configured to operate the switch to operatively couple the connected storage drive to the host computer.

38. The connection interface device of claim 29, wherein the connection interface device further includes a plurality of drive sockets configured to be connected to respective storage drives, and a corresponding plurality of switches, each switch being connected to a respective one of the plurality of drive sockets and being operable to couple the respective drive socket to the host computer when the respective storage drive is connected to the respective drive socket, and the processor assembly is configured to operate each of the plurality of switches to couple the respective connected storage drive to the host computer.

39. The connection interface device of claim 38, wherein the host computer further includes a communication socket and the connection interface device further includes a hub configured to operatively couple the plurality of switches to the communication socket for operatively coupling the connection interface device to the host computer.

* * * * *

UNITED STATES PATENT AND TRADEMARK OFFICE
CERTIFICATE OF CORRECTION

PATENT NO. : 10,430,361 B1  
APPLICATION NO. : 15/383750  
DATED : October 1, 2019  
INVENTOR(S) : James P. Wiebe, Dean L. Mehler and Randal Barber Page 1 of 1

It is certified that error appears in the above-identified patent and that said Letters Patent is hereby corrected as shown below:

On the Title Page

Item (72) for inventor James P. Wiebe, "Witchita" should be changed to --Wichita--.

Signed and Sealed this  
Twenty-sixth Day of November, 2019

Andrei Iancu  
*Director of the United States Patent and Trademark Office*